Oct. 5, 1965
G. BOJKO
3,210,752
MOVING OBJECT DETECTION SYSTEM
Filed July 26, 1963
3 Sheets-Sheet 1
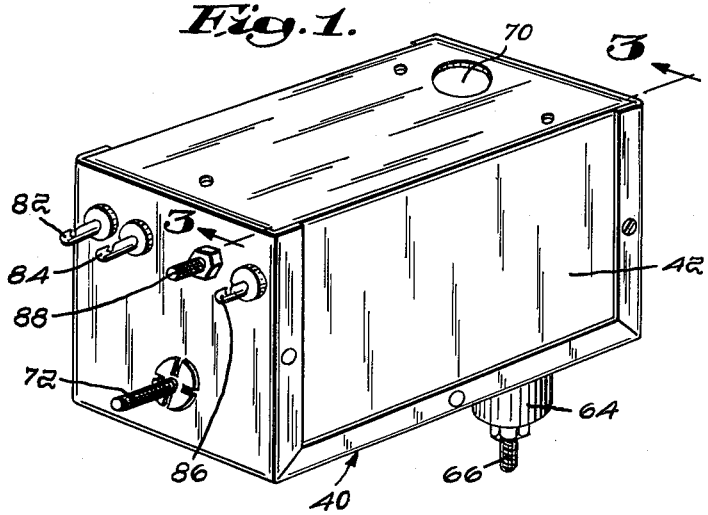
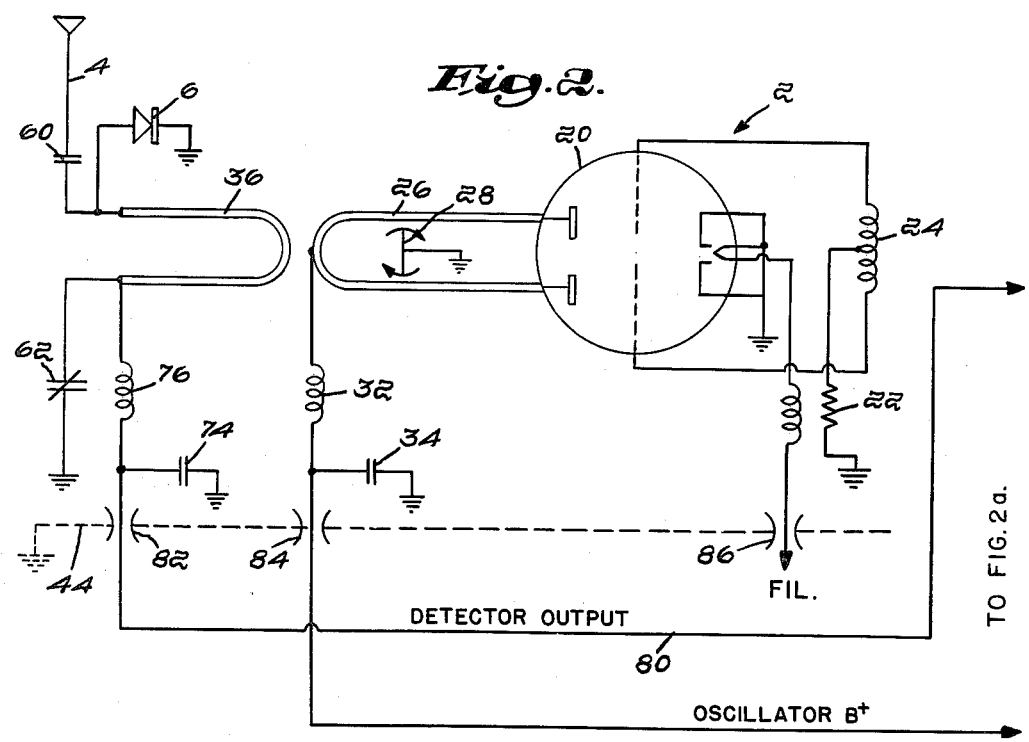
Inventor:
George Bojko,
by Russell, Chittick & Pfund
Attorneys Oct. 5, 1965  G. BOJKO  3,210,752
MOVING OBJECT DETECTION SYSTEM
Filed July 26, 1963  3 Sheets-Sheet 2
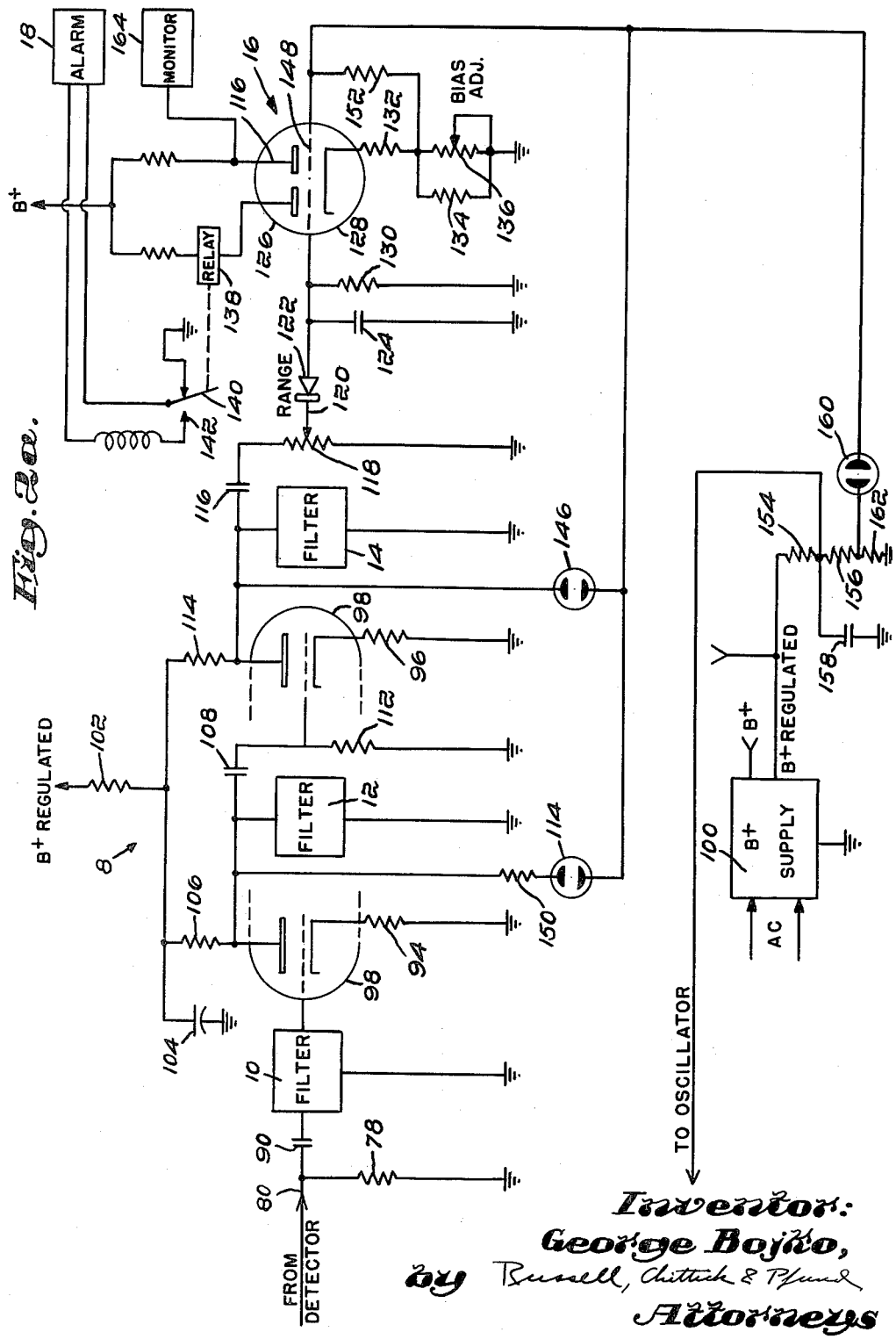
Inventor:
George Bojko,
by Bussell, Chittick & Pfund
Attorneys Inventor:
George Bojko,
by Russell, Chittick & Pfund
Attorneys

United States Patent Office 3,210,752
Patented Oct. 5, 1965

3,210,752
MOVING OBJECT DETECTION SYSTEM
George Bojko, Framingham, Mass., assignor to
Pinkerton's, Inc., a corporation of Delaware
Filed July 26, 1963, Ser. No. 297,911
6 Claims. (Cl. 340—258)

This invention relates to a moving object detection system, and more particularly to the generation, transmission and reception of radio frequency energy in a moving object detection system.

Moving object detection systems which utilize a continuous wave of radio frequency energy radiated from and received by a single antenna to determine the presence of a moving object within the standing wave pattern of the radiated radio frequency energy are well known in the prior art. A typical system is described in U.S. Patent 2,826,753, now Re. 25,100, wherein the returned energy reflected from the moving object strikes the original radiator and produces a voltage across the radiator impedance thereby causing current to flow through the impedance. Since the induced voltage differs both in amplitude and phase from the voltage supplied continuously by the oscillation generator, the two voltages combine in the radiator impedance and produce a new voltage which is the vector sum of the transmitted and received voltages. The new voltage fluctuates both in amplitude and phase in accordance with the motion of the object within the radiation field. The variations in either amplitude or phase or both can be detected and applied to a suitable indicator to provide a visual, aural or electrical indication of the presence of a moving object within standing wave pattern of the detection system.

The detection system represented by U.S. Patent 2,826,753, now Re. 25,100, had several limitations which curtailed its application in the moving object detection field. The oscillation generator was susceptible to variations in frequency produced by mechanical shock and electrical fluctuations within the oscillator. In addition to frequency instability, the oscillator had a relatively low power output which produced a limited area of coverage for the moving object detection system. The system also had a high degree of susceptance to false alarms caused by its inability to reject spurious radio frequency transmissions from police, fire and other communication systems operating within the vicinity of the moving object detector. Moreover, the detection system had only limited means for indicating a malfunction or failure of any of the components within the system.

Accordingly it is an object of the present invention to provide an improved oscillation generator with increased frequency stability and power output for a moving object detection system.

It is another object of the invention to provide a moving object detection system which is substantially insensitive to spurious radio frequency transmissions.

It is still another object of the invention to provide a moving object detection system which produces a positive indication of the failure or malfunction of selected components within the system, the failure of which most seriously compromise the security provided by the system.

These and other objects of the invention will be apparent from the following written description and drawings in which:

FIG. 1 is a view in perspective of the oscillator assembly which has been inverted for purposes of clarity;

FIG. 2 is a schematic of the oscillator;

FIG. 2a is a schematic and block diagram of the amplifier and alarm control circuits of the moving object detection system;

Figure 3:
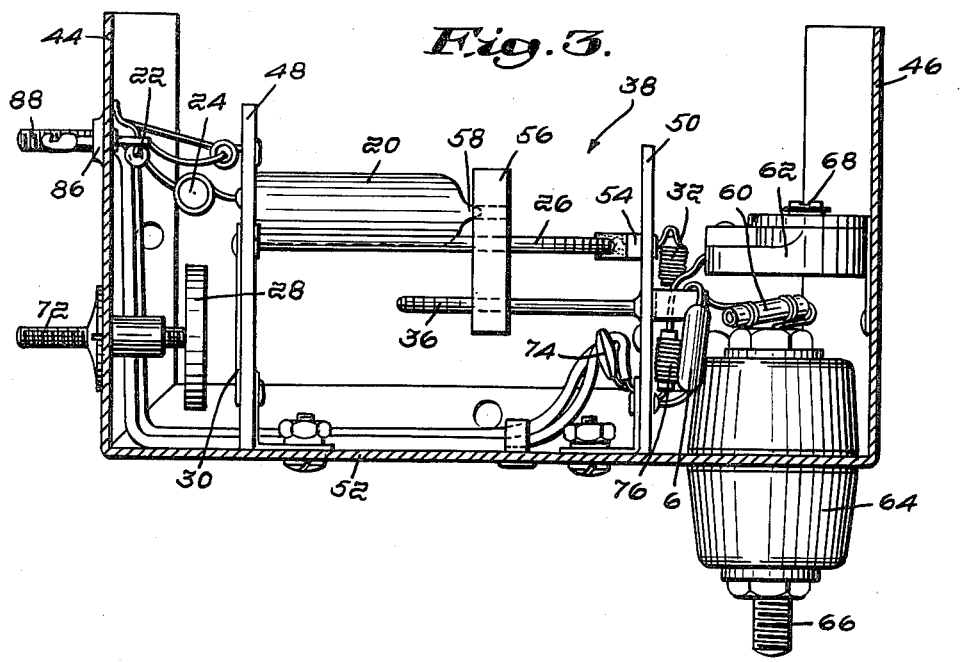
FIG. 3 is a cross section of the oscillator assembly taken in the vertical plane through line 3—3 of FIG. 1.

Turning now to the drawings, FIGS. 2 and 2a show in partial schematic representation and block diagram the entire moving object detection system. Before examining in detail the circuitry and function of each particular stage in the moving object detection system, it will be helpful to briefly describe the operation of the moving object detection system with reference only to the major components of the system. An oscillator, indicated generally as 2, generates a continuous sinusoidal wave of radio frequency energy which is radiated from an antenna 4 to create a standing wave pattern of alternate points of maximum and minimum energy disposed in the path of a moving object. The radio frequency energy reflected from the moving object intercepts the antenna 4 and produces a voltage across the impedance of the antenna 4 thereby causing current to flow through the impedance. The returned energy from the moving object combines with the oscillator energy in the impedance of the antenna 4 to form a new voltage therein which is the vector sum of the voltages induced in the antenna impedance by the transmission and reception of radio frequency energy.

The resultant voltage from the antenna impedance will fluctuate in amplitude and phase in accordance with the motion of the object through the radiation pattern and this fluctuation provides a means for detecting the presence of the moving object. The fluctuations are detected by a crystal detector 6 and the detected signals are amplified in an amplifier stage indicated generally as 8. The band-pass characteristic of the amplifier 8 is controlled by a filter system composed of filter systems 10, 12 and 14. The amplified and filtered signals which represent the presence of a moving object within the detection area by variations in amplitude and phase are coupled to an alarm control circuit generally indicated as 16 which triggers an alarm 18 in response to the amplified signals. Alarm 18 can be any one of a number of conventional alarms which will provide a visual, aural, electrical or other warning in response to signals representing the presence of a moving object within the standing wave pattern established by the radio frequency energy.

Figure 4:
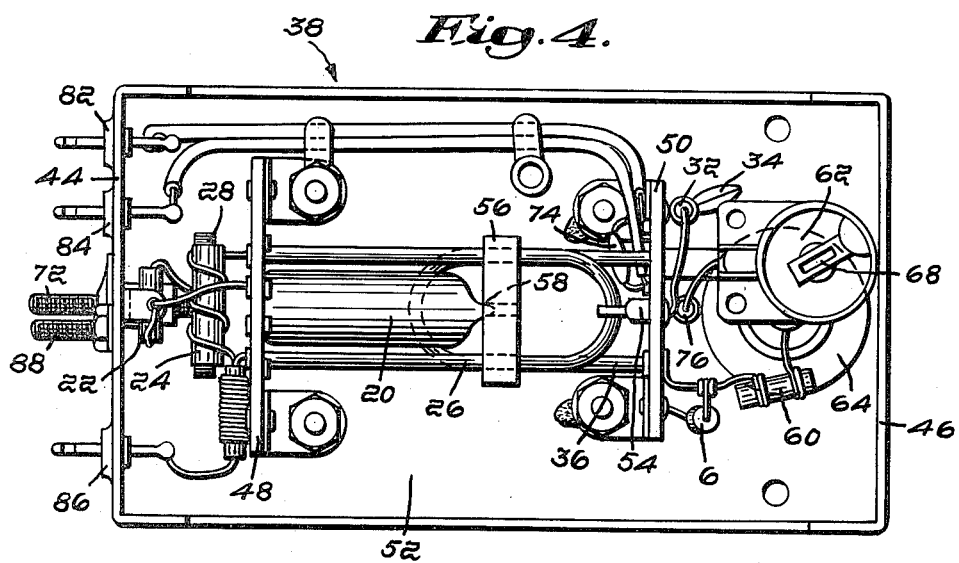
FIG. 4 is a plan view of the oscillator assembly with the cover removed.

Referring now to the circuitry of the moving object detection system, the following discussion can best be understood by viewing FIGS. 2 and 2a as a unit. The physical location of the electrical components of the portion shown in FIG. 2 is shown in FIGS. 1, 3 and 4.

The oscillation or signal generator 2 is a self-excited, twin triode tube oscillator operated as a tuned plate, tuned grid (TPTG) push-pull oscillator. Electron tube 20 can be any one of the twin triode series of tubes whose interelectrode capacitance is sufficient to provide a signal feedback of the proper phase and amplitude to sustain oscillation. The oscillator tube 20 is connected in a grounded cathode configuration with the grid bias being provided by the grid leak current through a grid resistor 22.

The tuned grid tank circuit for the TPTG oscillator consists of a center tapped inductor 24, the grid to cathode interelectrode capacitance of tube 20 and the stray capacitance of the associated wiring. The tuned plate tank circuit for the oscillator consists of an inductor 26 and a variable capacitor 28. Plate inductor 26 is formed from a length of number 10 A.W.G. wire bent into an elongated "U" shape and connected to the plates of the twin triode 20. The plate tank circuit is tuned by varying the balanced capacitance to ground of the tank capacitor 28. This is accomplished physically by changing the separation distance between the flat tuning disc of the capacitor 28 and two spaced flat plate line lead extensions 30, one of which is shown in FIG. 3.

The plate supply voltage for the plates of the twin triode 20 is applied to the electrical center of the "U" shaped plate line inductor 26 through a decoupling circuit consisting of a radio frequency choke 32 and a shunt capacitor 34.

The radio frequency output of the oscillator tube 20 is developed across the plate tank and coupled to the antenna circuit by the mutual inductance of the plate line inductor 26 and a link coupling inductor 36. Link inductor 36 is formed from #14 wire in the same manner as the plate line inductor 26 and is mounted in a plane parallel to the plane of the plate line inductor 26 at a distance determined by the degree of inductive coupling desired between the respective inductors.

The oscillator assembly, indicated generally as 38 in FIGS. 3 and 4, employs a modular construction to provide sufficient electrical shielding while maintaining a high degree of mechanical rigidity. The physical structure and mounting of the various oscillator components are clearly shown in the perspective view of FIG. 1 and the side cross-sectional and plan views of FIGS. 3 and 4. The oscillator 2 is constructed on a chassis 40 having dimensions of approximately 2¼" by 4" by 2¼". The chassis cover 42 has been removed in FIGS. 3 and 4 to show the internal placement of the oscillator components on the chassis 40.

The major components of the oscillator assembly are rigidly mounted on side walls 44 and 46 of chassis 40 and on two electrically insulating rigid mounting boards 48 and 50. The mounting boards 48 and 50 are secured to the chassis bottom wall 52 at right angles thereto and in parallel relation to each other as well as to the side walls 44 and 46. Link coupling inductor 36 is attached to mounting board 50 at right angles thereto and in parallel relation to the chassis bottom wall 52. Similarly, the plate inductor 26 is secured normal to mounting board 48 in parallel relation to the chassis bottom wall 52 and superposed above the link coupling inductor 36. The curved end of the "U" shaped plate inductor 26 is secured by solder to a conductive lug 54 mounted on board 50 which also provides the B+ plate feed. Both the link inductor 36 and the plate inductor 26 are maintained in their parallel superposed relation by passing through an intermediate rigid dielectric block 56 positioned between the mounting boards 48 and 50.

The base of oscillator tube 20 is rigidly secured to mounting board 48 while the tip portion 58 of the tube envelope is held in position by projecting into a hole in the intermediate block 56. It should be noted that the oscillator tube 20 is placed within the straight side portions of the "U" shaped plate inductor 26 and extends above the plane of the inductor.

The perpendicular and parallel relationships existing between chassis bottom wall 52 and the mounting boards 48 and 50, oscillator tube 20, plate and link inductors 26 and 36 and intermediate mounting block 56 provide a high degree of mechanical rigidity with a concomitant increased stability of the oscillator frequency.

The induced radio frequency energy in link coupling inductor 36 is coupled to the antenna 4 through a series capacitor 60. The series capacitance coupling of the link inductor 36 to antenna 4 significantly improves the interference ratio of the detection system and renders the sensitivity of the system relatively independent of antenna loading. The value of capacitor 60 is selected to provide sufficient capacitive reactance to block or greatly attenuate spurious radio frequencies falling below the transmitted frequency while at the same time presenting an effective RF short circuit to the transmitted frequency and the returned signal frequencies from a moving object within the detection environment.

Antenna loading is varied by changing the resonance of a series resonant circuit consisting of link coupling inductor 36 and a variable capacitor 62 connected between ground and coupling inductor 36. The trimmer capacitor 62 is physically secured to end wall 46 of chassis 40, as shown in FIGS. 3 and 4, directly above the porcelain feed-through insulator 64 for antenna 4. The antenna 4 is cut from a rod of ⅜" aluminum and dimensioned to form a quarter wave ground plane antenna at 400 megacycles. One end of the antenna 4 is drilled and tapped to fit the antenna mounting screw 66 shown in FIGS. 1 and 3.

The antenna loading can be peaked from outside of the oscillator chassis 40 because access to trimmer capacitor adjusting slot 68 is provided through a hole 70 in the chassis cover 42, as shown in FIG. 1. Tuning of the oscillator plate tank can also be accomplished externally by turning the variable capacitor adjusting screw 72 shown in FIGS. 1, 3 and 4. The external antenna loading adjustment and plate tank tuning thus permit the setting and adjustment of both oscillator frequency and antenna loading without disassembling the oscillator chassis 40 and cover 42. This greatly facilitates field installation and subsequent maintenance procedures for the motion detection system.

As mentioned previously, the voltages induced in the antenna impedance by the transmission and reception of RF energy combine in the impedance to form a new voltage which fluctuates both in amplitude and phase in accordance with the motion of an object within the detection area. The fluctuating RF voltage developed in the antenna circuit is detected by crystal diode 6 to produce a demodulated signal corresponding to the rectified RF. Capacitor 74 establishes an RF ground at one end of choke 76 and, in conjunction with resistor 78 shown in FIG. 2a, filters the demodulated signal produced by crystal detector 6. The rectified and filtered signal is taken from the detector circuit on line 80 through a feed-through and by-pass capacitor 82 mounted in the side wall 44 of oscillator chassis 40. Plate and filament supply voltages are connected to feed-throughs 84 and 86 respectively. A ground connection to chassis 40 is made to stud 88.

Referring now to FIG. 2a, the rectified and filtered signal across resistor 78 is coupled through capacitor 90 and filter system 10 to the first grid 92 of a twin triode amplifier, indicated generally as 8. The amplifier 8 is conventional in design with cathode resistors 94 and 96 supplying cathode bias for the respective halves of the twin triode tube 98. Plate voltage for the two halves of tube 98 is supplied from a regulated source of B+ voltage 100 through the decoupling circuit of resistor 102 and capacitor 104. The amplified signal is developed across plate load resistor 106 and capacitively coupled through capacitor 108 to grid 110 of the second half of the twin triode 98. Resistor 112 serves as the grid resistor for the second half of amplifier 8. The frequency response of the input circuit to grid 110 is determined by filter system 12 indicated in block diagram.

The amplified signal representing the motion of an object within the detection area is further amplified in the second half of the twin triode 98. The second stage amplified signal is capacitively coupled from plate load resistor 114 through capacitor 116 to a range potentiometer 118. The filter system 14 controls the band of frequencies applied to the range potentiometer 118. The bandpass of the entire amplifier stage 8 is limited by filter systems 10, 12 and 14 to approximately 0.1 to 10 cycles per second.

A portion of the motion induced signals between 0.1 and 10 c.p.s. impressed on range potentiometer 118 is tapped off by movable arm 120 and applied to the alarm control circuit indicated generally as 16. The movable arm 120 of the range adjust potentiometer 118 provides a variable sensitivity or range control for the moving object detection system. The range or distance from the antenna 4 within which moving objects will be detected and trigger the alarm circuit 16 is controlled by the range adjust potentiometer 118. The range will decrease as arm 120 is moved towards the ground end of potentiometer 118 because a "stronger" return signal will be required to overcome the voltage divider effect of potentiometer 118. Conversely, range will increase as arm 120 approaches the upper end of potentiometer 118.

A semiconductor diode 122 is connected to the movable arm 120 of range potentiometer 118 with polarities such that only the negative going portion of the detected signal is applied to an integrating capacitor 124. Capacitor 124 charges to the peak voltage of the negative going portion of the wave form and biases grid 126 of a twin triode alarm control tube 128. Negative bias on grid 126 is established by the charge on capacitor 124 only when a detected and amplified signal appears across the range potentiometer 118 as a result of an object moving within the detection range of the system and the RC time constant of capacitor 124 and grid resistor 130 is sufficient to maintain this negative bias on grid 126. If no motion induced signal is present across range potentiometer 118, capacitor 124 remains uncharged and the normal operating bias for grid 126 is supplied by the cathode bias from resistor 132 and the combined parallel resistance of resistor 134 and bias adjust potentiometer 136.

The bias adjust potentiometer 136 is initially adjusted so that both halves of the alarm control tube 128 are conducting in the absence of a signal from a moving object. A plate relay 138 energized by the conduction of the left half of the twin triode tube 128 keeps the alarm circuit open as long as the left half of the electron tube 128 is conducting.

As mentioned previously, the presence of a motion induced signal across the range potentiometer 118 will charge capacitor 124 so that a negative bias with respect to ground is applied to grid 126. The addition of this negative bias to the normal cathode bias on grid 126 is sufficient to cut off the left half of the twin triode 128. When grid 126 is driven into cutoff, current flow through the plate relay 138 ceases and relay 138 de-energizes. The de-energization of relay 138 makes the circuit between movable relay contact 140 and a fixed contact 142 thereby completing the alarm circuit and triggering alarm 18.

The moving object detection system as thus described will provide an alarm signal for the presence of a moving object within a predetermined and selected range provided that every stage of the detection system is functioning properly. However, if the oscillator 2 stops oscillating or one of the sections of the twin triode amplifier tube 98 becomes inoperative, the alarm 18 cannot be triggered by a motion induced signal. It should be noted that if there is a failure in the alarm control tube 128, which cuts off conduction or reduces conduction below the current sensitivity of plate relay 138, the relay 138 will drop out and trigger the alarm 18 thus indicating either the presence of a moving object or a malfunction in the alarm control tube 128. In other words the alarm control tube itself would "fail safe" i.e. it would give a positive indication of its own malfunction or failure.

In order to provide a similar indication of the failure or malfunctioning of any other major components of the motion detection system including the oscillator 2 and both halves of the amplifier tube 98, a simple and inexpensive means for positively triggering alarm 18 upon the failure or malfunctioning of these components has been incorporated in the detection system.

Referring to FIG. 2a and specifically the amplifier 8, it can be seen that two gaseous discharge lamps 144 and 146 are connected between the plate circuits of the twin triode 98 and control grid 148 of the second half of the alarm control tube 128. Decoupling resistor 150 is inserted in the circuit of discharge lamp 144 to damp out any low frequency oscillations which might occur upon the removal of the amplifier tube 98. The gaseous discharge lamps 144 and 146 may be filled with any suitable gas e.g. neon or argon, and they are selected so that the ionization potential of each lamp will be slightly higher than the normal operating plate voltage of the corresponding half of the twin triode amplifier tube 98. Thus if either half of the tube stops conducting or conduction decreases sufficiently to raise the plate potential to the ionization potential of the discharge lamp, the lamp will descharge thereby placing substantially all of the regulated B+ voltage across grid resistor 152. This causes the control half of the alarm control tube 128 to conduct heavily increasing the current through the common cathode resistors and biasing the left half of the alarm control tube to cut-off. When the grid 126 reaches cut-off potential, plate relay 138 de-energizes and triggers alarm 18. Thus it can be seen that a malfunction or non-function of either half of the amplifier tube 98 will trigger alarm 18 to provide a positive indication of the malfunction or non-function of the amplifier stage 8.

A similar "fail safe" system has been provided to indicate a filament burn out in the oscillator tube 20. The B+ voltage for oscillator tube 20 is taken from the voltage divider bleeder resistance at the junction of resistors 154, 156 and filter capacitor 158. A gaseous discharge lamp 160 connected between the junction of resistors 156 and 162 and the control grid 148 of alarm control tube 128 supplies the necessary "trigger" to the control tube to indicate filament burn out in oscillator 2. When oscillator tube 20 is conducting, the oscillator plate current through resistor 154 creates a voltage drop across the resistor of sufficient magnitude to place the potential at the junction of resistors 156 and 162 below the firing potential of the gaseous discharge lamp 160. However, if the filaments in oscillator tube 20 burn out, the oscillator plate current flow through resistor 154 will decrease to zero thus raising the potential at the junction of resistors 156 and 162 to the ionization potential of discharge lamp 160. The discharge lamp 160 fires and a predetermined portion of the B+ voltage is applied to the control grid 148 of the alarm control tube 128. This voltage is sufficient to drive the control half of the alarm control tube into heavy conduction thus increasing the cathode bias applied to grid 126 of the left half of the alarm control tube 126 and biasing it to cut-off at which point plate relay 138 drops out and alarm 18 is activated.

In any case of an alarm due to malfunction of the equipment, one or more of the neon lamps 144, 146 and 160 will be lit to give a visual indication that the alarm is due to a system failure rather than the presence of an intruder. Alternatively a remote monitor 164 of system malfunction can be coupled to plate 166 of the alarm tube 128 to permit true alarms and false alarms to be distinguished at the monitor station 164.

Although the preceding discussion has referred to drop-out or de-energization of the plate relay 138 as occurring when grid 126 is biased to cut-off because for all practical purposes these events happen instantaneously, it is obvious that plate relay 138 will be de-energized at some point short of cut-off depending upon the current sensitivity of the relay holding coil.

It is my intention to cover all changes and modifications of the invention chosen for purposes of disclosure which do not constitute departures from the spirit and scope of the invention. For example, transistor circuits embodying the features of the invention can be readily employed by those skilled in the art.

I claim:

1. In an electromagnetic moving object detection system including a signal generator, an antenna for simultaneous transmission and reception of radio frequency energy, and a detector whose output is amplified by an amplifier to activate an alarm device in response to the presence of a moving object; a radio frequency signal generator comprising: an electrically shielding base; a first electrically insulating rigid mounting board secured normal to said base; a second electrically insulating rigid mounting board secured normal to said base and parallel to said first mounting board; a U-shaped link coupling inductor having parallel end portions and a curved intermediate portion, said end portions being secured to said first mounting board so that the plane of said coupling inductor is normal to the plane of said mounting board; a U-shaped plate inductor having parallel end portions and a curved intermediate portion, said curved and parallel portions being secured to said first and second mounting boards, respectively, so that the plane of said inductor is normal to the planes of said mounting boards and parallel to and superposed on the plane of said coupling inductor; an electron tube mounted on said second rigid board intermediate of said first and second boards with the longitudinal axis of said tube parallel to the end portions of said plate and coupling inductors; electrical means for producing oscillations in said electron tube; and an electrically insulating rigid member disposed parallel to and intermediate of said first and second mounting boards having means for maintaining said coupling inductor, plate inductor and electron tube in parallel superposed relation whereby the frequency stability of the electron tube oscillator is made relatively insensitive to mechanical disturbances.

2. In an electromagnetic moving object detection system including a signal generator, an antenna for simultaneous transmission and reception of radio frequency energy, and a detector whose output is amplified by an amplifier to activate an alarm device in response to the presence of a moving object; a radio frequency oscillator assembly comprising: a chassis having a rectangular base and first and second side walls secured normal to said base at opposite sides threeof; a first electrically insulating rigid mounting board secured normal to said base and parallel to said side walls; a second electrically insulating mounting board secured normal to said base and parallel to said side walls and said first mounting board; a U-shaped link coupling inductor having parallel end portions and an intermediate curved portion, said end portions being secured to said first mounting board so that the plane of said coupling inductor is normal to said mounting board and parallel to said base; a U-shaped plate inductor having parallel end portions and a curved intermediate portion, said curved and parallel portions being secured to said first and second mounting boards, respectively, so that the plane of said plate inductor is normal to said mounting boards and parallel to and superposed on the plane of said coupling inductor; an electron tube mounted on said second mounting board intermediate of said first and second boards with the longitudinal axis of said tube parallel to the end portions of said coupling and plate inductors; electrical means for producing oscillations in said electron tube; an electrically insulating rigid member disposed parallel to and intermediate of said first and second mounting boards having means for maintaining said coupling inductor, plate inductor and electron tube in parallel superposed relation; a variable capacitor secured to said first side wall and electrically connected to one of said coupling inductor end portions; an antenna feed-through insulator mounted on said base between said first mounting board and said first side wall and capacitively coupled to the other of said coupling inductor end portions; a chassis cover having an aperture therein to provide access to said variable capacitor when said cover is secured to the chassis; and means for securing said chassis cover to said chassis.

3. An oscillator assembly according to claim 2 further characterized by said plate inductor end portions terminating in two parallel flat conductors mounted on said second mounting board at right angles to said plate inductor end portions, said conductors forming the stator of a plate tank variable capacitor; and a flat disc rotor movably mounted on the second side wall for adjustment in parallel relation to said stator, said adjustment being operable when said chassis cover is secured to said chassis whereby the capacitance of said variable capacitor can be externally adjusted to tune said plate tank.

4. In an electromagnetic moving object detection system including a signal generator, an antenna for simultaneous transmission and reception of radio frequency energy, and a detector whose output is amplified by an amplifier to activate an alarm device in response to the presence of a moving object; a radio frequency signal generator comprising: an electrically shielding base; a first electrically insulating rigid mounting board secured normal to said base; a second electrically insulating rigid mounting board secured normal to said base and parallel to said first mounting board; a U-shaped link coupling inductor having parallel end portions and a curved intermediate portion, said end portions being secured to said first mounting board so that the plane of said coupling inductor is normal to the plane of said mounting board; a U-shaped plate inductor having parallel end portions and a curved intermediate portion, said curved and parallel portions being secured to said first and second mounting boards, respectively, so that the plane of said inductor is normal to the planes of said mounting boards and parallel to and superposed on the plane of said coupling inductor; an electron tube mounted on said second rigid board intermediate of said first and second boards with the longitudinal axis of said tube parallel to the end portions of said plate and coupling inductors; an electrically insulating rigid member disposed parallel to and intermediate of said first and second mounting boards having means for maintaining said coupling inductor, plate inductor and electron tube in parallel superposed relation; electrical means for producing oscillations in said electron tube including a source of plate voltage; means for sensing predetermined departures from the normal operation of said radio frequency generator, said sensing means producing an output in response to said departures; and means operable by the output of said sensing means for activating said alarm device.

5. An electromagnetic detection system according to claim 4 wherein said sensing means comprises: a gaseous discharge lamp electrically connected to the plate of said electron tube and having a predetermined and selected ionization potential higher than the normal operating plate voltage of said electron tube, said gaseous discharge lamp being coupled to means operable by the discharge of said lamp for activating said alarm device to provide a warning of said predetermined departures from the normal operation of said signal generator.

6. In an electromagnetic moving object detection system including a signal generator, an antenna for simultaneous transmission and reception of radio frequency energy, a detector whose output is amplified by an amplifier to activate an alarm device in response to the presence of a moving object; a radio frequency oscillator-detector assembly comprising: an electrically shielding base; parallel first and second electrically insulating mounting boards secured normal to said base; a U-shaped plate inductor secured to said first and second boards in parallel relation with said base; a U-shaped link coupling inductor secured to said first mounting board in parallel relation to said plate inductor; an electron tube mounted on said second board intermediate of said first and second boards with the longitudinal axis thereof parallel to the straight portions of said U-shaped plate and coupling inductors; electrical means for producing oscillations in said tube; a crystal detector; and an electrically insulating rigid member disposed parallel to and intermediate of said mounting boards having means for maintaining said plate inductor, coupling inductor and electron tube in parallel relation whereby the frequency stability of the electron tube oscillator is made relatively insensitive to mechanical disturbances.

References Cited by the Examiner

UNITED STATES PATENTS

| | | | |
|---|---|---|---|
| 2,143,658 | 1/39 | Morris | 334—80 X |
| 2,149,829 | 3/39 | Beers | 340—248 X |
| 2,179,101 | 11/39 | Read. | |
| 2,345,042 | 3/44 | Frundt | 340—251 X |
| 2,405,229 | 8/46 | Mueller et al. | 331—99 |
| 2,453,489 | 11/48 | Bruntil et al. | 331—99 |
| 2,467,737 | 4/49 | Germer | 334—80 X |
| 2,568,715 | 9/51 | Brown et al. | 334—80 X |
| 2,826,753 | 3/58 | Chapin | 340—258 |
| 2,832,950 | 4/58 | Snyder | 340—258 |
| 2,907,012 | 9/59 | Pitman et al. | |
| 2,960,657 | 11/60 | Edgerly | 340—248 |
| 2,971,184 | 2/61 | Pearson et al. | 340—258 |
| 3,135,936 | 6/64 | Martin | 334—89 X |

NEIL C. READ, *Primary Examiner.*